E. B. MANNING.

Tea and Coffee Pot.

No. 2,075.

Reissued Sept. 26, 1865.

WITNESSES:

Mary A. Hine

Rufus H. Sanford

INVENTOR.

Edward B. Manning

By his atty John E. Earle

N. PETERS. Photo-Lithographer, Washington, D. C.

UNITED STATES PATENT OFFICE.

EDWARD B. MANNING, OF CROMWELL, CONNECTICUT.

TEA AND COFFEE POT.

Specification forming part of Letters Patent No. 35,457, dated June 3, 1862; Reissue No. 2,013, dated June 27, 1865; Reissue No. 2,075, dated September 26, 1865.

*To all whom it may concern:*

Be it known that I, EDWARD B. MANNING, of Cromwell, in the county of Middlesex and State of Connecticut, have invented a new and useful Improvement in Tea and Coffee Pots; and I do hereby declare the following, when taken in connection with the accompanying drawings and the letters of reference marked thereon, to be a full, clear, and exact description of the same, and which said drawings constitute part of this specification, and represent, in—

Figure 1:
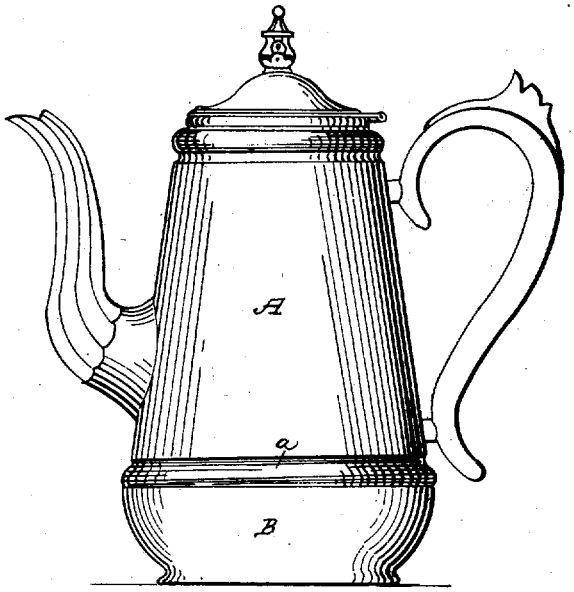
Figure 1:
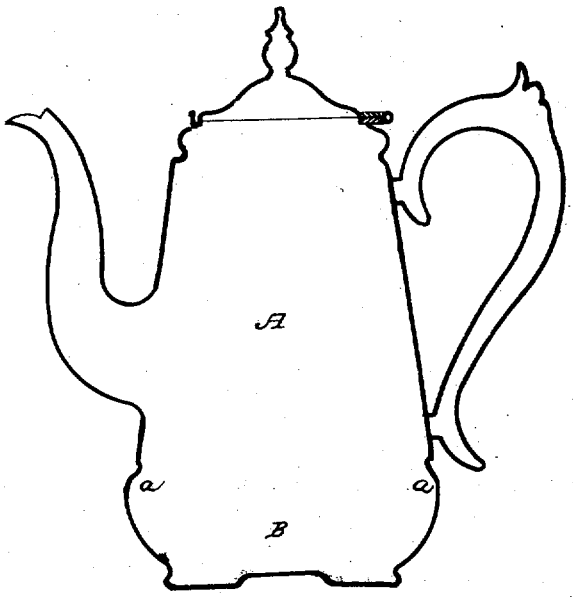

Figure 1, a side view, and in Fig. 2 a vertical central section.

Britannia metal, as is well known, is one of the cheapest and at the same time one of the most beautiful metals for the construction of tea and coffee pots, as its ductility permits its easy formation to any required shape, and at the same time is capable of receiving a high polish, but from its liability to fuse at a low degree of heat it is not adapted to uses where necessarily brought into contact with highly heated surfaces, as in the construction of tea or coffee pots, which are generally placed upon a highly heated stove or range for the purpose of drawing or boiling tea or coffee. Other metals capable of sustaining a greater heat—as block-tin, &c., less beautiful in appearance—have therefore to a very considerable extent been used for such purposes, but in these metals the ordinary construction presents a great difficulty; first, the body is united to a flat bottom by a folded and soldered joint so near the bottom that when the vessel is placed upon a highly heated surface, as for the purpose of boiling, &c., the heat from the range or stove often melts the solder and partially disunites the body from the bottom, so as to make the vessel leak. Another difficulty from this construction of joint arises from the fact that it is almost impossible to remove all the moisture from the joint upon the inside when not in use. This moisture soon rusts through the metal and destroys the vessel.

My invention, designed to overcome these difficulties, consists in constructing a flat bottom and the lower part of the body up far enough to prevent injury to the joint from the heat arising from the surface upon which the vessel may be placed, from a single piece of metal, fusible only at a high degree of heat, and the upper part of the body from Britannia, tin, or other metal, the two parts of the body conforming to each other and united by a simple joint in such manner as to be easily dried when not in use, and when so constructed may be placed directly upon a heated surface, as upon a range or stove, without injury to the joint or any part of the vessel.

To enable others skilled in the art to construct my improved tea or coffee pot, I will proceed to fully describe the same as illustrated in the accompanying drawings.

The upper part, A, of the body is made of Britannia, tin, or other metal, and may be of any desired form into which the metal is capable of being wrought. The lower part, B, of the body is of iron or any other metal capable of sustaining a high degree of heat without injury, and is "struck up" to correspond with the form of the upper part of the body.

The part B may be tinned and polished, so as to be rendered nearly as smooth, bright, and elegant in its appearance as britannia itself, and then the whole vessel harmonize as if made of the same material.

The lower part, B, of the body is united to the upper part, A, of the body at or near the upper edge, *a*, of the part B, which is some distance above the flat bottom, or far enough to prevent injury to the joint or upper part of the body when the vessel is placed upon highly-heated surfaces as a stove or range, for the purpose of steeping or drawing tea, &c.

In all the attempts which have heretofore been made to prevent britannia coffee and tea pots from being injuriously affected by the heat, by combining some other with them, such result has been sought to be obtained either by the use of feet, or a ring, or ledge, placed under the vessel, or by making the bottom surface of copper, brass, or similar metal. In the former cases, when feet or a ring, or ledge, are used, the bottom of the coffee or tea pot is raised above the range or stove. This interferes with the quick and proper action of steeping or boiling in such vessels. When the bottom surfaces of such articles have been made of firmer metal, the joint between the two different kinds of metal has been, in order to preserve the beauty and appearance of the pot, either directly on the edges of the bottom or just above it, so that the heated surface of the stove, &c., would act directly on such joint to unsolder it or melt the britannia body, or would be so near such joint as to produce the same effect of rendering the vessel leaky and useless. All such combinations have either raised the vessel from the heating-surfaces, thereby rendering the vessels less adapted for the purposes for which intended, or the attached bottom has been extremely liable, if not certain, to become unsoldered and leaky whenever the pot was applied to its appropriate uses.

By my improved form of construction, and of combining the firmer metal with the britannia, the bottom of the vessel can be made and left flat, so as to come in close contact with the range, &c., thereby causing the operation of steeping, &c., to be quickest, (and in the preparation of tea and coffee, the quickness with which the strength is drawn from the substance is very important and essential to the goodness of the decoction produced,) and all danger or liability of the joint being loosened and the vessel rendered leaky is effectually prevented and obviated. By heavily tinning the lower part of the vessel and polishing the same I also produce a vessel of as neat and elegant appearance as if entirely made of britannia, but at the same time having all proper resistance to heat where such resistance is necessary. If tin or other metal be used instead of britannia for the upper portion of the body, it may be formed in the usual manner of forming similar vessels from the same metal, and united with the lower portion of the body in similar manner as before described for the britannia body, by which construction I am enabled to produce a tea or coffee pot much more durable, and (if the body be of tin) at little if any more cost than the common tin tea or coffee pot, and a construction which admits of variation of form which cannot be attained in the common and well-known mode of manufacture.

Thus my invention or improvement does not consist in simply combining with or uniting to Britannia or other metal another metal which will bear a greater degree of heat, but in constructing the lower and bottom part of the pot from such other metal, by swaging or otherwise, into any desired artistic shape corresponding with the shape of the upper portion of the body, and in uniting the two parts by placing the joint or place of connection between the two so far above the bottom surface that, while the said bottom surface may be flat and in direct contact with the heating-surface, neither such joint nor the upper portion of the body will be injuriously affected by heat.

I do not claim the forming of pots and vessels of different kinds of metal, as this has been before done; but What I do claim as my invention, and desire to secure by Letters Patent, is—

The herein-described tea or coffee pot, in which the bottom and lower portion of the body is constructed of hard metal, (as iron,) united to a Britannia or other metal body, in the manner described, when the said hard metal bottom and body are formed in the manner described and united to the upper portion of the body a sufficient distance from the bottom to protect the joint and upper portion of the body from the effects of heat, as and for the purpose specified.

E. B. MANNING.

Witnesses:
A. B. CALEF,
ROBT. BOWMAN.